(12) United States Patent
Griggs (10) Patent No.: US 11,320,142 B2
(45) Date of Patent: *May 3, 2022

(54) APPARATUS FOR HEATING FLUIDS

(71) Applicant: Cavitation Holdings, LLC, Atlanta, GA (US)

(72) Inventor: James L. Griggs, Acworth, GA (US)

(73) Assignee: Cavitation Holdings, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/249,459

(22) Filed: Jan. 16, 2019

(65) Prior Publication Data

US 2019/0257513 A1 Aug. 22, 2019

Related U.S. Application Data

(63) Continuation of application No. 14/575,546, filed on Dec. 18, 2014, now Pat. No. 10,222,056, which is a
(Continued)

(51) Int. Cl.
*F22B 3/06* (2006.01)
*F24V 40/00* (2018.01)
(Continued)

(52) U.S. Cl.
CPC .............. *F22B 3/06* (2013.01); *B01D 1/0011* (2013.01); *C02F 1/043* (2013.01); *C02F 1/36* (2013.01);
(Continued)

(58) Field of Classification Search
CPC .................................. F24J 3/003; F22B 3/06
(Continued)

(56) References Cited

U.S. PATENT DOCUMENTS

| 1,758,207 A | 5/1930 | Walker |
| 2,316,522 A | 4/1943 | Loeffler |

(Continued)

FOREIGN PATENT DOCUMENTS

| GB | 284824 A | * | 2/1928 | ............... F22B 3/06 |
| RU | 1788009 A2 | * | 1/1993 | |

(Continued)

*Primary Examiner* — Steven B McAllister
*Assistant Examiner* — Aaron H Heyamoto
(74) *Attorney, Agent, or Firm* — Meunier Carlin & Curfman LLC (57) ABSTRACT

The apparatus described herein uses a disc wafer-type rotor featuring channels disposed around its circumference and around the interior circumference of the rotor housing specifically to induce cavitation. The channels are shaped to control the size, oscillation, composition, duration, and implosion of the cavitation bubbles. The rotor is attached to a shaft which is driven by external power means. Fluid pumped into the device is subjected to the relative motion between the rotor and the device housing, and exits the device at increased temperature. The device is thermodynamically highly efficient, despite the structural and mechanical simplicity of the apparatus. Such devices accordingly provide efficient, simple, inexpensive, and reliable sources of distilled potable water for residential, commercial, and industrial use, as well as the separation and evaporation of other liquids.

20 Claims, 5 Drawing Sheets

Related U.S. Application Data continuation of application No. 13/475,351, filed on May 18, 2012, now abandoned.

(60) Provisional application No. 61/488,061, filed on May 19, 2011.

(51) Int. Cl.
| | | |
|---|---|---|
| *C02F 1/36* | (2006.01) | |
| *B01D 1/00* | (2006.01) | |
| *C02F 1/04* | (2006.01) | |
| *C02F 1/78* | (2006.01) | |
| *C02F 101/32* | (2006.01) | |
| *C02F 103/36* | (2006.01) | |
| *C02F 103/10* | (2006.01) | |

(52) U.S. Cl.
CPC ............... *F24V 40/00* (2018.05); *C02F 1/78* (2013.01); *C02F 2101/32* (2013.01); *C02F 2103/10* (2013.01); *C02F 2103/365* (2013.01); *F24D 2200/30* (2013.01)

(58) Field of Classification Search
USPC ............................. 126/247; 202/175; 122/26
See application file for complete search history.

(56) References Cited

U.S. PATENT DOCUMENTS

| | | | |
|---|---|---|---|
| 2,991,764 A | 7/1961 | French | |
| 3,198,191 A | 8/1965 | Wyszomirski | |
| 3,508,402 A | 4/1970 | Gray | |
| 3,690,302 A | 9/1972 | Rennolds | |
| 3,720,372 A | 3/1973 | Jacobs | |
| 3,791,349 A | 2/1974 | Schaefer | |
| 4,273,075 A | 6/1981 | Freihage | |
| 4,277,020 A | 7/1981 | Grenier | |
| 4,366,803 A * | 1/1983 | Hodge | F24V 40/00 126/247 |
| 4,381,762 A | 5/1983 | Ernst | |
| 4,454,861 A * | 6/1984 | Grenier | F24V 40/00 126/247 |
| 4,779,575 A | 10/1988 | Perkins | |
| 4,781,151 A | 11/1988 | Wolpert et al. | |
| 4,798,176 A * | 1/1989 | Perkins | F24V 40/00 122/26 |
| 5,188,090 A | 2/1993 | Griggs | |
| 5,385,298 A | 1/1995 | Griggs | |
| 5,915,341 A | 6/1999 | Moroi et al. | |
| 5,931,153 A | 8/1999 | Giebeler et al. | |
| 5,957,122 A | 8/1999 | Griggs | |
| 5,957,177 A | 9/1999 | Griggs | |
| 6,019,947 A | 2/2000 | Kucherov | |
| 7,028,643 B1 | 4/2006 | Kuo et al. | |
| 7,089,886 B2 | 8/2006 | Thoma | |
| 7,201,225 B2 | 4/2007 | Smith et al. | |
| 7,736,518 B2 | 6/2010 | Smith et al. | |
| 7,780,149 B2 | 8/2010 | Donnelly | |
| 7,887,862 B2 | 2/2011 | Paz Briz et al. | |
| 2004/0103856 A1 | 6/2004 | Thoma | |
| 2006/0185621 A1* | 8/2006 | Foster | F22B 1/1807 122/26 |
| 2009/0050572 A1 | 2/2009 | McGuire et al. | |
| 2009/0056645 A1 | 3/2009 | Hobbs et al. | |
| 2010/0154772 A1 | 6/2010 | Harris et al. | |
| 2010/0326424 A1* | 12/2010 | Bennett | F02G 1/0435 126/600 |
| 2011/0253634 A1 | 10/2011 | Soane et al. | |

FOREIGN PATENT DOCUMENTS

| | | |
|---|---|---|
| RU | 2149181 | 5/2000 |
| WO | 2008/108596 | 9/2008 |

\* cited by examiner

APPARATUS FOR HEATING FLUIDS

CROSS REFERENCE TO RELATED APPLICATIONS

This application is a continuation of application Ser. No. 14/575,546, filed Dec. 18, 2014, which is a continuation of application Ser. No. 13/475,351, filed May 18, 2012, which claims the benefit of U.S. Provisional Application No. 61/488,061, filed May 19, 2011, the disclosures of which are herein incorporated by reference.

BACKGROUND OF THE INVENTION

The present invention is an apparatus for heating liquids using a rotor and housing featuring indentations therein that induce cavitation bubbles in the liquid. The heat generated when these bubbles rapidly collapse is transferred to the fluid. Thus, the apparatus permits efficient heat transfer to a fluid without a solid heat exchanger interface.

There are a variety of patented devices (see table below) that use mechanical energy to increase the temperature and/or pressure of fluids. Some of these prior art devices heat the fluid through friction between the fluid and the walls of a rotor and housing. In other prior art designs, mechanical agitation of the liquid generates heat. The '349 patent to Schaefer discloses an apparatus to produce steam pressure by inducing shock waves in a distended body of water. The '020 patent to Greiner describes a rotor and housing assembly where fluids are heated by shearing and friction between the walls of a rotor and housing containing circumferential indentations. The Griggs patents disclose a method of heating fluids through the production of shock waves in the liquid, where shock waves are induced by pumping a liquid into an enclosed chamber and spinning a rotor containing cylindrically-shaped dead-end bores. Venturi tubes are also used to induce cavitation in liquids.

| U.S. Pat. No. | Inventor | Issue Date |
| --- | --- | --- |
| 1,758,207 | G. H. Walker | May 13, 1930 |
| 2,316,522 | J. E. Loeffler | Apr. 13, 1943 |
| 2,991,764 | C. D. French | Jul. 11, 1961 |
| 3,198,191 | S. W. Wyszomirski | Aug. 3, 1965 |
| 3,508,402 | V. H. Gray | Apr. 28, 1970 |
| 3,690,302 | P. J. Rennolds | Sep. 12, 1972 |
| 3,720,372 | J. W. Jacobs | Mar. 13, 1973 |
| 3,791,349 | C. D. Schaefer | Feb. 12, 1974 |
| 4,273,075 | D. A. Freihage | Jun. 16, 1981 |
| 4,277,020 | W. J. Grenier | Jul. 7, 1981 |
| 4,381,762 | A. E. Ernst | May 3, 1983 |
| 4,779,575 | E. W. Perkins | Oct. 25, 1988 |
| 4,781,151 | G. H. Wolpert, Jr., et. al. | Nov. 1, 1988 |
| 5,188,090 | J. L. Griggs | Feb. 23, 1993 |
| 5,385,298 | J. L. Griggs | Jan. 31, 1995 |
| 5,957,122 | J. L. Griggs | Sep. 28, 1999 |
| 7,089,886 | Thoma | Aug. 15, 2006 |

Mechanically-induced cavitation is a well-known phenomenon, first encountered in the late 19th century during investigations into ship propeller design. Rapid motion of propeller blades through water produces a low-pressure region near the surface of the propeller blade that results in transient bubbles being formed: a process now known as cavitation. The subsequent rapid implosion of cavitation bubbles caused by the high ambient water pressure results in the generation of enormous turbulence, heat, and pressure. The temperature generated during the collapse of a cavitation bubble can exceed 5000 degrees Celsius.

Although cavitation is generally undesirable in marine propulsion applications, various devices have been employed for the last few years for the production and implosion of cavitation bubbles for research in ultrasound, acoustical cavitation for chemical processes and related fields.

The apparatus described herein is intended for applications in fluid purification, distillation, and even pasteurization. Conventional technologies for purification, distillation, and pasteurization typically involve direct heating of a fluid. In direct heating, heat exchange occurs at a solid interface between a heat source and the subject fluid. In other words, as a fluid flows through a heat exchanger, heat is transferred to the fluid via direct contact between the fluid and the wall of the heat exchanger. However, direct heating has a number of disadvantages. First, direct heating results in heat exchanger scaling or coking. This necessitates relatively frequent maintenance to remove the scaling or coking. In the pasteurization context, direct heating can result in scorching and destruction of the product to be pasteurized.

SUMMARY OF THE INVENTION

The present invention solves these problems because using cavitation-induced heating eliminates the heat transfer interface; heat transfer occurs directly within the fluid. The apparatus disclosed herein purifies fluids through distillation by mechanically generating cavitation in order to heat the fluid. When the cavitation bubbles collapse, the heat generated is transferred to the fluid directly.

Cavitation-induced heating has a number of advantages in heating fluids. In the petroleum industry, cavitation-induced heating allows petroleum products to be heated directly in storage tanks in the field, on pipelines, or on barges to facilitate pumping and unloading in cold weather, and heavy oil products could be heated for processing without heat exchanger scaling. In ethanol production, cavitation-induced heating eliminates the need for a steam boiler and allows up to four steps in the distillation process to be combined, which reduces production time and cost. In dairy production, cavitation-induced heating results in reduced maintenance, since pasteurization would occur without direct contact between the milk and a heat exchanger surface. This is particularly beneficial in the pasteurization of high fat dairy products. Cavitation-induced heating has also shown promising ability in generating relatively high concentrations (up to 40%) of hydrogen peroxide ($H_2O_2$) from tap water. A potential medical application of the apparatus described herein destroys pathogens though cavitation-induced heating of blood or other bodily fluids.

Figure 7:
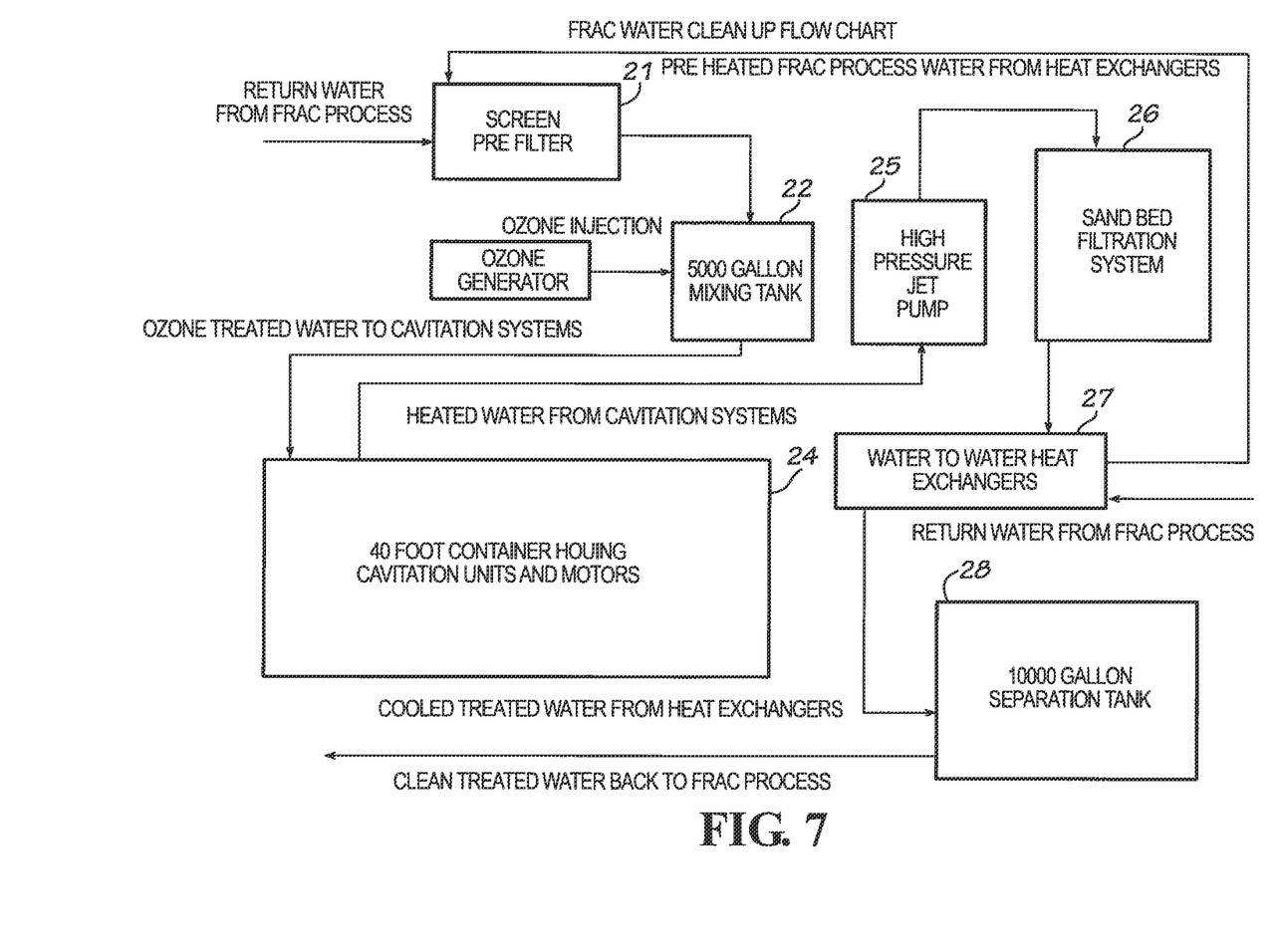
FIG. 7 is a system block diagram of an application of the invention used to purify waste water byproducts from hydraulic fracturing operations used in natural gas production.

One of the most popular current applications, however, is use of cavitation-induced heating to purify polluted water through distillation. Cavitation-induced heating systems have been used in purifying glycol-tainted water used in airport de-icing operations. Another application is purifying water that has been used in hydraulic fracturing (or "fracking") operations used in natural gas production fields. The water used to fracture natural gas bearing rock, or "frac water", is usually contaminated with sulfur and other minerals during the process and requires treatment before its return to the environment. A block diagram of a typical system is shown in FIG. 7, in which a self-contained, easily movable 40-foot trailer houses the cavitation generators, motors, and other components described below.

Another potential application of cavitation-induced heating is purification of seawater. Current sea water distilling technology typically uses electricity to generate heat. However, energy is lost generating steam to produce the electricity, and additional energy is lost in transmitting electricity to the desalinization plant. However, using cavitation-induced heating would be extremely efficient in converting seawater into steam. As the steam is condensed back across a low pressure-condensing generator, both potable water and electricity could be produced.

The preferred embodiment of the present invention uses a shaft-driven, disc wafer type rotor (for easy modification for size and production design) rotating at relatively high speed (1600-4000 RPM) within a housing to mechanically generate cavitation bubbles in a fluid being pumped through the cavity within the housing past the spinning rotor. The shaft may be driven by electric motor, combustion engine, windmills, animal power or other motive means known to the art. Both the rotor and the housing have non-cylindrical shaped irregularities which induce cavitation. Unlike the systems described in the prior patents to Griggs which had cylindrical shaped dead-end bores in the rotor only, the embodiments described herein generate cavitation using indentations running across both the rotor and the interior surface of the housing, as shown in FIGS. 2-6. These indentations will be described in greater detail below; however, the general principle is that as fluid flows past indentations in the rotor, low pressure regions are generated, resulting in the formation of transient cavitation bubbles. When these transient bubbles collapse, heat is imparted directly to the fluid. Heat is therefore rapidly generated and transferred to the fluid without heat transfer having to occur between the fluid and a surface.

It is therefore an object of the present invention to provide a device for heating a fluid using a rotor and a stationary housing, which device is structurally simple with reduced manufacturing and maintenance costs. Maintenance costs are reduced because, in one preferred embodiment, seals are located on only one side of the generator. Mechanical seals typically are the most maintenance-intensive components of the system, requiring frequent replacement. Prior designs by Griggs included bearing and seal assemblies on both sides of the shock generator unit; however, the current design only has bearings and seals on one side.

It is an additional object of the present invention to produce a mechanically elegant and thermodynamically highly efficient means for increasing pressure and/or temperature of fluids such as water (including, where desired, converting fluid from liquid to gas phase).

It is an additional object of the present invention to provide a system for generating and imparting heat within a fluid for residential, commercial and industrial applications, using devices featuring a mechanically driven cavitation-inducing rotor and housing.

Other objects, features and advantages of the present invention will become apparent with reference to the remainder of this document.

DETAILED DESCRIPTION OF THE INVENTION

Figure 1:
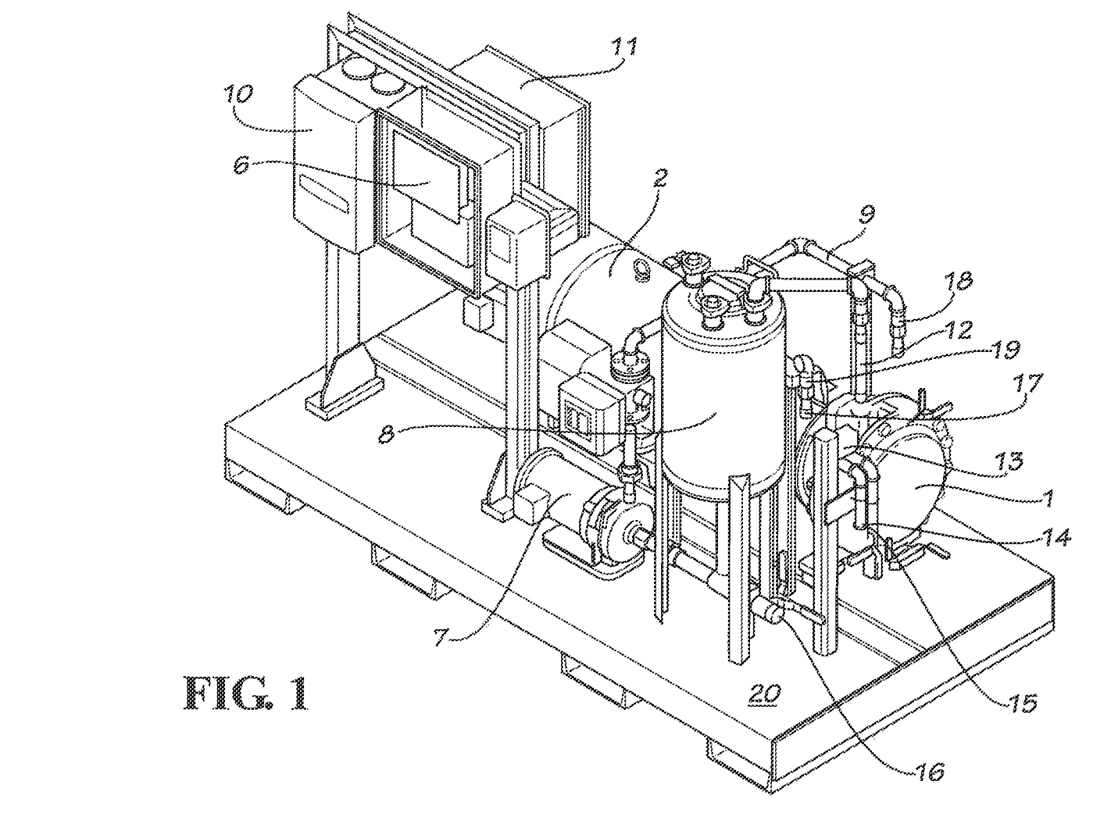
FIG. 1 is an isometric rendering of the components of a cavitation-based distillation system.
Figure 2:
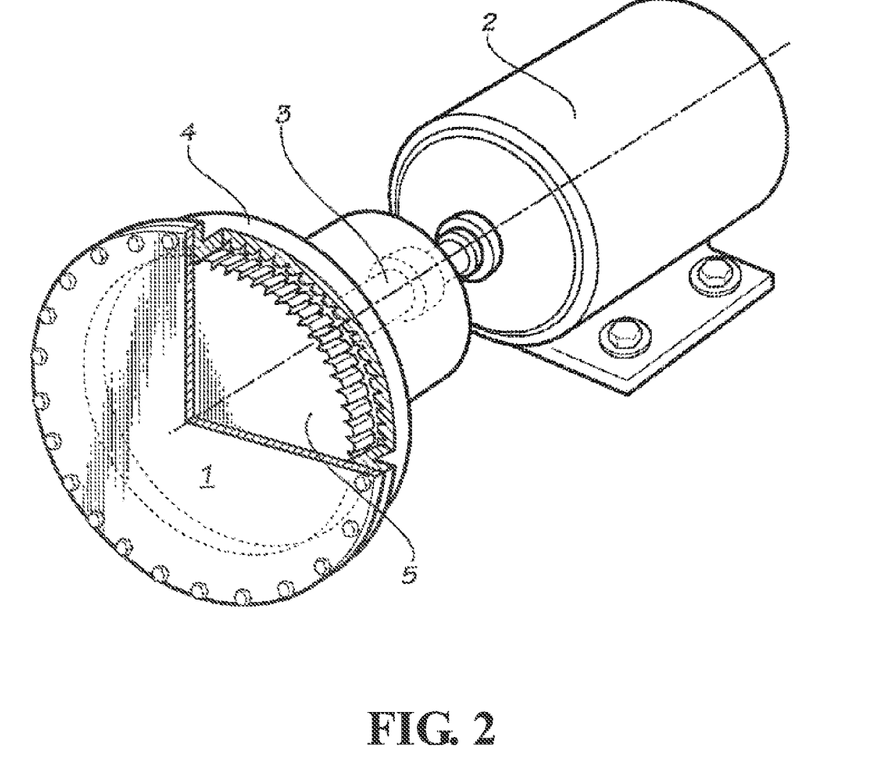
FIG. 2 shows an isometric rendering of the cavitation generator unit and motor, with a cutaway view of the cavitation generator showing the irregularities in the rotor and rotor housing.

FIG. 1 shows the overall configuration of the preferred embodiment of a system 20 designed to purify contaminated water, such as frac water, in batches. The contaminated fluid is first pumped into tank 8. From the tank, the fluid passes through tank outlet line 17 to the inlet of cavitation generator 1. As shown in FIG. 2 and as described above, the cavitation generator consists of two primary parts, a rotor housing 4 and a rotor 5. The rotor 5 is driven by a shaft 3 that is coupled to a motor 2. In the preferred embodiment, an electric motor is used. The size of the motor is dependent on the size of the unit; typically, 500 or 1000 horsepower motors would be used for applications requiring purification of up to 100,000 gallons per day. One skilled in the art will realize that any type of motive power capable of providing torque to a shaft can be substituted for an electric motor, although in these cases additional mechanical complexity may be required in the form of gears to match motor speed with the desired rotor rotational speed (typically 1600-4000 RPM).

The speed of the rotor is one of several variables involved in inducing cavitation. Typically, the outer edge of the rotor indentations (i.e. the tips shown in FIGS. 3-6) must have a speed of at least 90 feet per second to induce cavitation in frac water, so the smaller the rotor diameter, the larger the RPM required to generate the required tip speed, and vice versa. The RPM range given above was found to be sufficient for rotors ranging in size from 5 inches in diameter to 36 inches in diameter.

Figure 3:
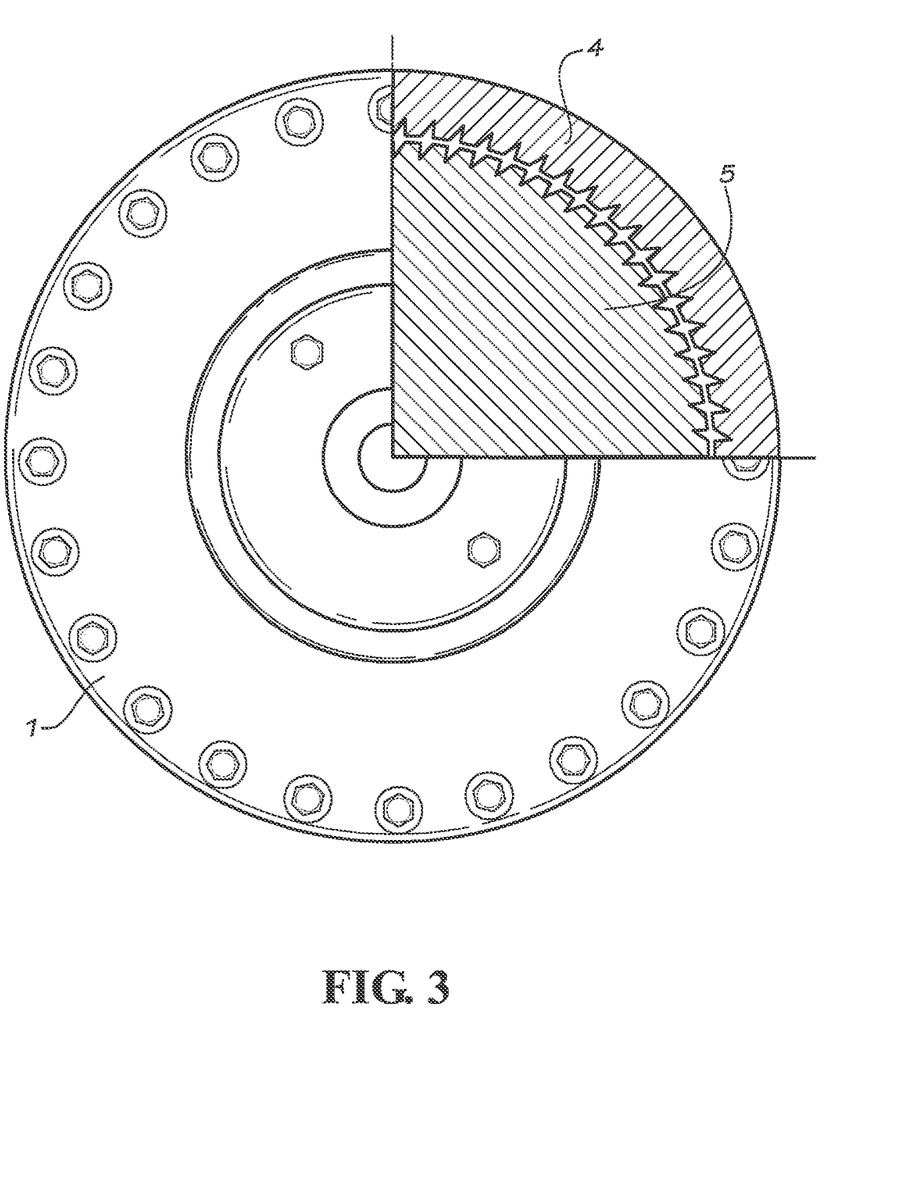
FIG. 3 shows a cross sectional cutaway view showing the cavitation generating irregularities of the rotor and rotor housing.

As contaminated fluid passes from tank 8 into the inlet of the cavitation generator 1, it fills a cavity between the rotor 5 and the rotor housing 4 as shown in FIG. 3. For applications involving frac water, the gap between the rotor and housing is 0.250 inches. This gap, however, varies with the type of fluid designed to be heated. The exterior of the rotor and the interior of the housing contain indentations that are designed to maximize cavitation in the fluid flowing through the cavitation generator.

Figure 4:
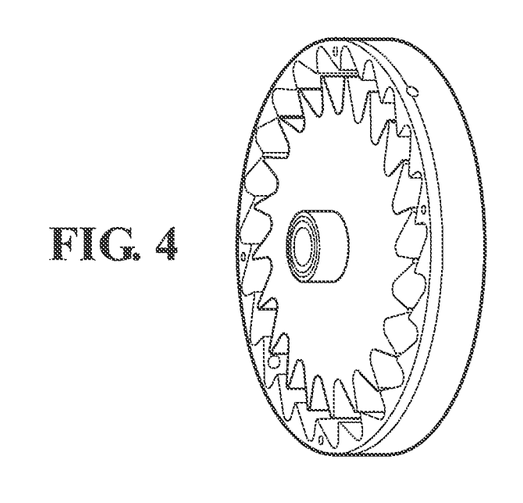
FIG. 4 shows an embodiment of the cavitation generator having smoothly curved channels in the circumference of the rotor and the rotor housing.
Figure 5:
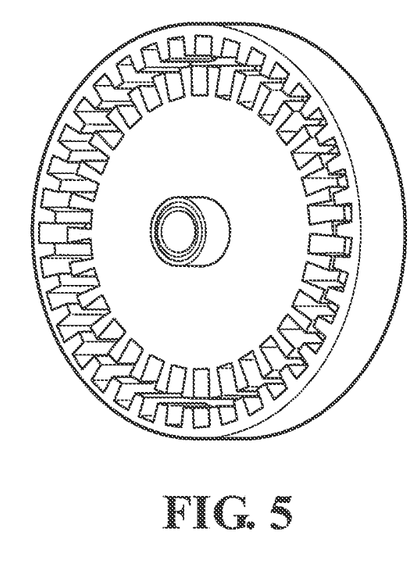
FIG. 5 shows another embodiment of the cavitation generator having angular, square-shaped channels in the circumference of the rotor and the rotor housing.
Figure 6:
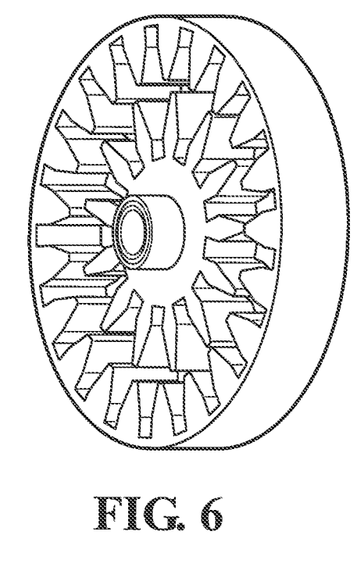
FIG. 6 shows another embodiment of the cavitation generator having open polygonal shaped channels in the circumference of the rotor and the rotor housing.

As shown in FIG. 3, these indentations may be inclined into or away from the direction of rotation. The angle of inclination of the indentations either into or away from the flow and the depth of the indentations themselves will depend on the nature of the fluid to be heated. FIGS. 3, 5-6 shows indentations that are defined by the intersection of planar surfaces, while FIG. 4 shows indentations that are curved.

Cavitation bubbles are generated as the low-pressure boundary layer of the water in contact with the surface of the rapidly spinning rotor is swept over the lip of the indentations. This is similar to water flowing around a sharp bend in a pipe, where the pressure on the outside (concave wall) of the curve is higher than that on the inside (convex wall), where cavitation can occur. In the pipe the bubbles would be carried away by the movement of the fluid, but in the present invention the rotor indentations' shape and depth act to fix the location of the cavitation bubbles until the bubbles implode generating heat which is immediately imparted to the fluid. Additionally as the harmonics of the device come into play the bubbles began to oscillate and continue to reform and collapse. Bubble size and collapse are the results of the specifics of the irregularities and rotor design, causing millions of cavitation bubbles to form and collapse simultaneously. The heat generated by the collapsing bubbles is imparted directly to the fluid.

The depth, shape, and number of these indentations, their inclination relative to the fluid flow, the speed of the outer part of the rotor (i.e. the tip), as well as the amount of time the fluid spends inside the cavitation generator determine how effective the cavitation generator is at generating heat. These variables depend upon the nature of the fluid to be heated. The viscosity of the fluid is a major factor in optimizing the design of the rotor and housing. Higher viscosity fluids are generally more resistant to the formation of cavitation. All of the current embodiments feature indentations in both the rotor and the interior housing, which tend to increase the shear and therefore are ideally suited to counteract viscosity effects in the fluid.

Contaminated fluid pumped into cavitation generator 1 flows past the rotor, which is moving at high speed relative to the fluid. Hydrodynamic flow patterns over the irregularities described above in the rotor and housing result in low pressure regions in the indentations, which causes the rapid formation and collapse of cavitation bubbles, resulting in heat which is then transferred to the fluid. The heated fluid passes out of the cavitation generator 1 and back into tank 8 through tank inlet line 9. The temperature differential between the inlet and outlet of the cavitation generator is measured by water inlet temperature sensor 18 and water outlet temperature sensors 19 and displayed on panel 6. The contaminated fluid is recirculated between tank 8 and cavitation generator 1 until the fluid in the tank begins to vaporize. Pressure in the system is maintained by recirculation pump 7. In the preferred embodiment, recirculation pump is a centrifugal pump driven by a 1 horsepower electric motor controlled from control panel 10.

As fluid continuously circulates from tank 8 to the cavitation generator 1 and back, the temperature of the fluid rises until steam is produced in tank 8. The steam produced from the contaminated fluid in the tank passes through the top of tank 8 into steam supply line 12 and then into heat exchanger 13. In heat exchanger 13, the steam condensed and passes through condensate outlet line 15 and is collected. The collected fluid has now been purified and can be returned to its source. Cooling water from an outside source, such contaminated frac water as shown in FIG. 7, is provided to the system through heat exchanger cooling water inlet 14. Power to the recirculation pump 7 is controlled at panel 10, system temperatures are displayed on panel 6, and power is provided through power box 11.

The fluid purification system described above processes contaminated fluid in batches. Once the level of the contaminated fluid in the tank decreases to a certain level, additional fluid is added. At the end of the purification process, remaining liquid in tank 8 is drained through tank drain valve 16.

Prior art cavitation generators by Griggs used cylindrical dead-end bores in the rotor to generate shock waves in the fluid. However, it was discovered that cavitation effects were enhanced by modifying Griggs' design in two ways.

First, the Griggs patents only disclose cylindrical indentations disposed around the circumference of the rotor. However, the current invention uses linear or curvilinear channels in the inner surface of the rotor housing that are similar to, and complimentary with, similar channels on the rotor's circumference. It was discovered that the presence of channels in the inner surface of the housing as well as on the rotor increases shear in the fluid, encouraging turbulence and greatly enhancing cavitation and water hammer effect. As explained above, cavitation is desirable in this application because the rapid formation and violent collapse of cavitation bubbles generated results in significant heat being generated internally in the fluid.

Second, instead of cylindrical dead-end bores disposed around the circumference of the rotor, the channels in the rotor's circumference extend across the width of the rotor, which results in increased surface area exposed to the fluid. In certain preferred embodiments shown in FIGS. 2, 3, 5 and 6, when viewed in cross section, the channels have one or more angular corners defined by two or more intersecting planar surfaces in the rotor where the linear intersection of these two surfaces is oriented generally parallel to the rotor's rotational axis. In other embodiments, however, the channels have smoothly curved walls ending with a discontinuity at the tip, such as those shown in FIG. 4.

Initial test results indicate that the currently disclosed design is more efficient than prior art models. Distilling units using designs disclosed herein are approximately 30% smaller than prior art units based on Griggs' earlier cylindrical dead-end bore design, for the same amount of distilling capacity.

Other rotor and housing embodiments specifically adapted for heating contaminated water ("frac water") used in hydraulic fracturing ("fracking") operations are shown in FIGS. 5 and 6. One embodiment shown in FIG. 5 has a rotor that is 8.5 inches in diameter. The rotor channels disposed circumferentially when viewed in cross section are rectangular with a depth of approximately 0.75 inch and a width of approximately 0.5 inch. The rotor housing is 10.5 inches in outside diameter and 9.0 inches in inner diameter, and the corresponding channels in the rotor housing are typically 0.5 inches in depth and 0.5 inches in width. The gap between the edge of the mouth of the channels in the rotor and the rotor housing is 0.25 inches.

A second rotor-rotor housing embodiment used in frac water purification is shown in FIG. 6. The rotor is 6.75 inches in diameter, and the channels in the rotor are defined by open pentagonal channels disposed around the rotor's circumference as shown in FIG. 6. The bottom of the channels are typically square, with 0.5 inches on a side, with the channels flaring out at an angle to the outer circumference of the rotor (i.e. the tip of the tooth attached to the rotor). The outer diameter of the rotor housing is 10.5 inches and the inner diameter is 7.25 inches, leaving a gap of 0.25 inches between the tip of the pentagonal teeth of the rotor and the mouth of the channels in the rotor housing.

Also, it should be noted that although the rotor herein may be cylindrical, the rotor used in the preferred embodiments is a disc-wafer type rotor i.e., a flat disc with thickness less than its diameter, as opposed to the cylinder-shaped rotor disclosed in the prior Griggs patents. In the embodiments shown in FIGS. 5 and 6, the width of the rotor is 1.5 inches and the outside width of the rotor housing is 1.875 inches.

Yet another embodiment that is a working prototype for a full-scale system features a 9.5 inch diameter rotor that is 1 inch wide. The rotor is driven with a 25 horsepower motor to 4000 RPM. Such a prototype has purified 6.75 gallons of water per hour. A larger embodiment that is also a working prototype has a 28 inch diameter rotor which is 3 inches wide. the rotor is driven by a 125 horsepower diesel engine at 1800 RPM and distills 20 gallons of water every 2 hours and 20 minutes.

Another, large-scale embodiment of the system that is used to reclaim contaminated frac water is shown in FIG. 7. Return water from the fracturing process is pumped through a pre-screen filter 21, then into a mixing tank 22 where it is mixed with ozone from an ozone generator 23. The ozone-treated water from mixing tank 22 is then pumped to a 40 foot long container 24 housing the system 20 described above and shown in FIG. 1. The heated water is sent through a high-pressure jet pump 25, a sand bed filtration system 26, and then to heat exchanger 27. In heat exchanger 27, the steam is condensed through heat exchange with return water from the fracturing process. The return water is thereby pre-heated before it passes through pre-screen filter 21. The condensed water is then stored in a separation tank 28, before being either discharged to the environment or reused in the fracking process.

What is claimed is:

1. An apparatus for inducing cavitation in a fluid in order to heat said fluid, said apparatus comprising:
    a rotor having a first set of indentations disposed in a first surface and spaced around its circumference, wherein each indentation of the first set of indentations extends along a longitudinal axis, and each of the longitudinal axes of the indentations of the first set of indentations extends in an axial direction of the rotor, wherein a diameter of the rotor is greater than a width of the rotor;
    a rotor housing having a second set of indentations disposed in a second surface opposing said first set of indentations, wherein each indentation of the second set of indentations extends along a longitudinal axis, and each of the longitudinal axes of the indentations of the second set of indentations extends in an axial direction of the rotor housing, the rotor being associated with the rotor housing such that the rotor rotates relative to the rotor housing so that the first and second sets of indentations pass one another as the rotor rotates relative to the rotor housing, wherein said rotor and said rotor housing define a cavity through which a fluid passes from an inlet to an outlet; and
    a steam generation tank in fluid communication with the cavity,
    wherein the size of the cavity and the shapes of the first set of indentations and second set of indentations induces cavitation in said fluid passing through the cavity as the rotor rotates relative to the rotor housing; and
    wherein the cavitation causes the rapid formation and collapse of cavitation bubbles, resulting in heat which is transferred to the surrounding fluid and causing steam to form in the steam generation tank.

2. The apparatus according to claim 1, wherein said first set of indentations are channels across the width of the rotor, and said second set of indentations are channels extending across the width of the rotor housing.

3. The apparatus according to claim 2, wherein said first set of indentations and said second set of indentations are linear when viewed in cross-section perpendicular to an axis of rotation of the rotor.

4. The apparatus according to claim 2, wherein said first set of indentations and said second set of indentations are curvilinear when viewed in cross-section perpendicular to an axis of rotation of the rotor.

5. The apparatus according to claim 2, wherein said first set and said second set of indentations are open-ended polygons when viewed in cross-section perpendicular to an axis of rotation of the rotor.

6. The apparatus according to claim 1, wherein said fluid is pumped through said cavity by a pump.

7. The apparatus according to claim 1 wherein said fluid is contaminated frac water.

8. The apparatus according to claim 7, wherein said first surface and said second surface are separated by a distance of 0.250 inch or less.

9. The apparatus according to claim 7, wherein optimum cavitation generation is achieved when said rotor is rotated at 1600-4000 RPM.

10. The apparatus according to claim 1, further comprising a heat exchanger in fluid communication with the steam generation tank.

11. The apparatus according to claim 10, wherein the heat exchanger condenses steam from the steam generation tank.

12. An apparatus for inducing cavitation in a fluid in order to heat said fluid, said apparatus comprising:
    a first surface having a first set of indentations disposed thereon and spaced substantially around the first surface, wherein each indentation of the first set of indentations extends along a longitudinal axis, and each of the longitudinal axes of the indentations of the first set of indentations extends in an axial direction of the first surface, wherein a diameter of the first surface is greater than a width of the first surface,
    a second surface having a second set of indentations disposed thereon and opposing said first set of indentations, wherein each indentation of the second set of indentations extends along a longitudinal axis, and each of the longitudinal axes of the indentations of the second set of indentations extends in an axial direction of the second surface, said first surface and said second surface being associated with one another such that said second surface is configured to move relative to said first surface so that the first and second sets of indentations pass one another, wherein the first and second surfaces define a cavity having an inlet configured to receive the fluid and an outlet, such that the fluid passes through the cavity between the inlet and the outlet,
    a steam generation tank in fluid communication with the cavity,
    wherein the size of the cavity and the shapes of the first set of indentations and second set of indentations induces cavitation in said fluid passing through the cavity as the first surface moves relative to the second surface, and
    wherein the cavitation causes the rapid formation and collapse of cavitation bubbles, resulting in heat which is transferred to the surrounding fluid and causing steam to form in the steam generation tank.

13. The apparatus according to claim 12, wherein said first surface is a rotor housing and said second surface is a rotor, wherein said rotor housing and said rotor define a cavity.

14. The apparatus according to claim 13, wherein said second surface is a disc-wafer shaped rotor.

15. The apparatus according to claim 12, wherein fluids are pumped through said cavity by a pump.

16. The apparatus according to claim 12, wherein said fluid is contaminated frac water.

17. The apparatus according to claim 16, wherein said first surface and said second surface are separated by a distance of 0.250 inch or less.

18. The apparatus according to claim 16, wherein said rotor is rotated at 1800-4000 RPM.

19. The apparatus according to claim 12, wherein said first set and said second set of indentations are open-ended polygons when viewed in cross-section perpendicular to an axis of rotation of the rotor.

20. The apparatus according to claim 12, further comprising a heat exchanger in fluid communication with the steam generation tank.

\* \* \* \* \*